United States Patent
Paglia et al.

(10) Patent No.: US 7,253,236 B2
(45) Date of Patent: Aug. 7, 2007

(54) GRAFTED FLUOROELASTOMERS

(75) Inventors: Patrick Luigi Paglia, Geneva (CH); Walter Werner Schmiegel, Wilmington, DE (US)

(73) Assignee: DuPont Performance Elastomers L.L.C., Wilmington, DE (US)

( * ) Notice: Subject to any disclaimer, the term of this patent is extended or adjusted under 35 U.S.C. 154(b) by 251 days.

(21) Appl. No.: 11/134,098

(22) Filed: May 20, 2005

(65) Prior Publication Data
US 2005/0277740 A1    Dec. 15, 2005

Related U.S. Application Data

(60) Provisional application No. 60/578,592, filed on Jun. 10, 2004.

(51) Int. Cl.
*C08F 259/00*    (2006.01)
(52) U.S. Cl. .................. 525/276; 525/326.2; 525/374; 525/384
(58) Field of Classification Search ................ 525/276, 525/326.2, 374, 384
See application file for complete search history.

(56) References Cited

U.S. PATENT DOCUMENTS

| | | |
|---|---|---|
| 4,243,770 A | 1/1981 | Tatemoto et al. |
| 4,645,799 A | 2/1987 | Wachi et al. |
| 4,742,126 A | 5/1988 | Moggi et al. |
| 4,985,520 A | 1/1991 | Hayashi et al. |
| 5,367,023 A | 11/1994 | Caporiccio et al. |
| 5,395,886 A | 3/1995 | Caporiccio et al. |
| 5,654,375 A | 8/1997 | Jing et al. |
| 5,756,588 A | 5/1998 | Kolb et al. |
| 6,020,440 A | 2/2000 | Tabb |
| 6,211,319 B1 * | 4/2001 | Schmiegel .................. 526/242 |
| 6,423,784 B1 | 7/2002 | Hamrock et al. |
| 6,664,339 B2 | 12/2003 | Schmiegel et al. |
| 6,838,407 B2 | 1/2005 | Halladay et al. |

FOREIGN PATENT DOCUMENTS

| | | |
|---|---|---|
| EP | 0109745 A1 | 5/1984 |
| WO | WO 2004/000896 A1 | 12/2003 |

* cited by examiner

*Primary Examiner*—Bernard Lipman

(57) ABSTRACT

Polyhydroxy curable fluoroelastomers that are substantially free of nucleophilic endgroups are grafted with a monophenol having at least one pendant group. The resulting grafted fluoroelastomers retain most of the properties of the original elastomers including excellent pre-vulcanization characteristics, while incorporating pendant groups which may be used for further modification, crosslinking or for changing the physical properties (e.g. $T_g$) of the fluoroelastomer.

12 Claims, No Drawings

GRAFTED FLUOROELASTOMERS

CROSS-REFERENCE TO RELATED APPLICATIONS

This application claims the benefit of U.S. Provisional Application No. 60/578,592 filed Jun. 10, 2004.

FIELD OF THE INVENTION

This invention relates to grafted fluoroelastomers having a plurality of monophenol grafting agents bonded to carbon atoms on the fluoroelastomer, said fluoroelastomers being resistant to thermally induced pre-vulcanization and substantially free of nucleophilic endgroups.

BACKGROUND OF THE INVENTION

Fluoroelastomers are well known in the art. Many are copolymers of vinylidene fluoride ($VF_2$) with at least one other fluorinated comonomer such as hexafluoropropylene (HFP), tetrafluoroethylene (TFE), and a perfluoro(alkyl vinyl ether). Other fluoroelastomers include copolymers of tetrafluoroethylene with a hydrocarbon olefin such as ethylene or propylene and copolymers of tetrafluoroethylene with a perfluoro(alkyl vinyl ether).

It is sometimes desirable to modify the properties of fluoroelastomers by grafting molecules onto the main polymer chains or onto side chains. The grafted molecules have pendant groups that can be employed for further modification, crosslinking, or for changing the physical properties (e.g. $T_g$) of the fluoroelastomer.

A typical graft involves the reaction of carbon-carbon double bonds on the fluoroelastomer with a grafting agent that has a single nucleophilic group (e.g. a "monophenol") for reacting with the double bond. An agent having more than one nucleophilic group could result in crosslinking of fluoroelastomer chains and is not desirable. Grafting agents typically have one or more pendant groups such as a vinyl, allyl, acrylate, alkoxysilane, amido, sulfonic acid salt, pyridine, carboxylic ester and carboxylic salt group for modifying the fluoroelastomer properties. The carbon-carbon double bonds on the elastomer may be present prior to when the elastomer is mixed with the grafting compound, or the double bonds may be generated by a dehydrofluorination catalyst (i.e. an accelerator) in the presence of the grafting compound.

Unfortunately, the grafting process often results in an undesirable pre-vulcanization (i.e. increase in Mooney viscosity) of the fluoroelastomer composition that adversely affects subsequent processing, causing the composition to be difficult to mix, extrude or mold. The latter is sometimes referred to as "scorch". This scorch phenomenon is a particular problem when the grafting reaction takes place in the bulk with a substantially dry fluoroelastomer gum.

Caporiccio et al. (U.S. Pat. No. 5,367,023) performed grafting in a dispersion or solution, rather than in the bulk with a substantially dry fluoroelastomer gum. However, the resulting grafted fluoroelastomer composition may still exhibit undesirable pre-vulcanization during further processing such as mill mixing, extruding or molding.

Halladay et al. (U.S. Pat. No. 6,838,407 B2) disclose a room temperature curable fluoroelastomer composition. The fluoroelastomer is grafted in the bulk with an agent having an active hydrogen-bearing group for subsequent crosslinking with an isocyanate. Grafting is preferably through an amino group or through a mercapto group. Such grafted fluoroelastomer compositions may still exhibit undesirable pre-vulcanization during further processing such as mill mixing, extruding or molding. Furthermore, amino and mercapto group grafts are undesirable in some end use applications because of the relatively poor hydrolytic stability of imine bonds resulting from amino group grafting and the limited thermal stability of sulfide bonds resulting from mercapto group grafting.

An object of the present invention is to make a monophenol grafted fluoroelastomer in the bulk, substantially dry state, wherein both the graftable composition and the resulting grafted fluoroelastomer have improved resistance to thermally induced pre-vulcanization.

SUMMARY OF THE INVENTION

It has been surprisingly discovered that polyhydroxy curable fluoroelastomers that are substantially free of nucleophilic endgroups may be grafted with a monophenol in the bulk, substantially dry state, to yield grafted fluoroelastomers that have not pre-vulcanized during the grafting process and that are resistant to pre-vulcanization during subsequent processing such as mill mixing, extruding or molding. Pre-vulcanization, when present, is due to the reaction of nucleophilic endgroups present on fluoroelastomer chains with carbon-carbon double bonds on fluoroelastomer chains that are formed during the grafting reaction. This reaction yields a gelled, high Mooney viscosity, difficult to process elastomer. Thus, minimizing or eliminating nucleophilic endgroups on the fluoroelastomer, minimizes or eliminates pre-vulcanization. The level of nucleophilic endgroups on fluoroelastomers can be difficult to measure. An indirect measure is the rise in Mooney viscosity that takes place when a graftable or a grafted composition in which active nucleophilic endgroups are present is tested in a Mooney viscometer for 18 minutes at 135° C. after a 1 minute preheat, i.e. ML(1+18). A fluoroelastomer having a Mooney viscosity, ML(1+18) at 135° C., less than 160 is substantially free of nucleophilic endgroups for purposes of this invention.

Accordingly, an aspect of the present invention is a grafted fluoroelastomer, said fluoroelastomer having a plurality of pendant groups bonded to carbon atoms on said grafted fluoroelastomer through monophenols, said grafted fluoroelastomer being substantially free of nucleophilic endgroups and having Mooney viscosity, ML(1+18) at 135° C., of less than 160.

Another aspect of the present invention is a graftable fluoroelastomer composition comprising a polyhydroxy curable fluoroelastomer substantially free of nucleophilic endgroups; a monophenol grafting agent; an accelerator; and an acid acceptor, said composition having a Mooney viscosity, ML(1+18) at 135° C., of less than 160.

Another aspect of the present invention is a process for making a grafted fluoroelastomer, said process comprising:

a) mixing in the bulk i) a polyhydroxy curable fluoroelastomer gum, said fluoroelastomer being substantially free of nucleophilic endgroups with ii) a monophenol having a pendant group, iii) an accelerator and iv) an acid acceptor to form a graftable fluoroelastomer composition; and b) heating said graftable composition at a temperature between 80° C. and 250° C., thereby producing a grafted fluoroelastomer having a plurality of pendant groups bonded to carbon atoms on said grafted fluoroelastomer through monophenols, said grafted fluoroelastomer being substantially free of nucleophilic endgroups and having a Mooney viscosity, ML(1+18) at 135° C., of less than 160.

In an alternative process of the invention, steps a) and b) in the above process may be combined into a single step wherein mixing of the ingredients takes place at a temperature between 80° C. and 250° C. so that grafting occurs during mixing.

Another aspect of the present invention is a process for making a grafted fluoroelastomer from a polyhydroxy curable fluoroelastomer gum, said process comprising:

a) mixing in the bulk, at a temperature between 80° and 250° C., i) a polyhydroxy curable fluoroelastomer gum, said fluoroelastomer being substantially free of nucleophilic endgroups, with ii) an accelerator and iii) an acid acceptor, in the absence of a grafting agent, to form an unsaturated fluoroelastomer composition;

b) mixing i) said unsaturated fluoroelastomer composition with ii) a monophenol having a pendant group, iii) an accelerator and iv) an acid acceptor to form a graftable composition; and c) heating said graftable composition at a temperature between 80° C.-250° C., thereby producing a grafted fluoroelastomer having a plurality of pendant groups bonded to carbon atoms through monophenols, said grafted fluoroelastomer being substantially free of nucleophilic endgroups and having a Mooney viscosity, ML(1+18) at 135° C., of less than 160.

Another aspect of the present invention is a grafted fluoroelastomer made by any of the above processes.

DETAILED DESCRIPTION OF THE INVENTION

The present invention is directed to processes for making a grafted fluoroelastomer having good pre-vulcanization characteristics and a plurality of pendant groups bonded to carbon atoms on the fluoroelastomer through monophenol linkages, preferably to carbon atoms along the main polymer chain of the elastomer. The grafted fluoroelastomer is substantially free of nucleophilic endgroups. Preferably, the grafted fluoroelastomer has a weight average molecular weight ($M_w$) of at least 30,000, preferably between 50,000 and 500,000. The grafting process is conducted with a fluoroelastomer that is substantially dry, i.e. containing less than 5 weight percent, preferably less than 1 weight percent, water or solvent.

Suitable pendant groups include, but are not limited to vinyl, allyl, acrylate, amido, sulfonic acid salt, pyridine, carboxylic ester, carboxylic salt groups and hindered silanes that are aliphatic or aromatic tri-ethers or tri-esters. These pendant groups do not react during the grafting of the monophenol to the fluoroelastomer. By the term "monophenols having a pendant group" is meant an aromatic grafting agent that has a single —OH group for grafting to the fluoroelastomer and at least one pendant group (other than —OH) such as those pendant groups mentioned above. Monophenols having more than one nucleophilic group are to be avoided so that undesirable crosslinking of the fluoroelastomer does not occur during grafting. In the grafting reaction, the monophenol is bonded, through its oxygen atom, to carbon atoms on the fluoroelastomer at unsaturated sites where a polyhydroxy curative would normally react. Graftable compositions of this invention typically contain 0.1 to 75 parts by weight of grafting agent per hundred parts fluoroelastomer (i.e. 0.1 to 75 phr), preferably 1 to 5 phr.

Specific examples of monophenols having a pendant group include, but are not limited to allylic monophenols such as 2-methoxy-4-allyl phenol (eugenol); 2-allylphenol; 2,5-diallylphenol; p-acetamidophenol; m-hydroxy-N-methylacetanilide; p-hydroxymethylbenzoic acid phenyl ester; hydroxybenzoic acid phenylesters; 3-hydroxy-2-naphthoic acid phenyl ester; monoacrylate esters of bisphenols, dihydroxybenzenes or dihydroxynaphthalenes such as the monoacrylate ester of 1,2- or 2,3-dihydroxynaphthalene; vinyl phenols such as 4-hydroxystyrene; and monoallyl ethers or monovinyl ethers of a dihydroxy aromatic such as the monovinyl or monoallyl ethers of bisphenol AF.

Fluoroelastomers that are suitable for use in this invention are those that are polyhydroxy curable. By "polyhydroxy curable" is meant fluoroelastomers which are known to crosslink with polyhydroxy curatives such as bisphenol AF. Such fluoroelastomers include those having a plurality of carbon-carbon double bonds along the main elastomer polymer chain and also fluoroelastomers which contain sites that may be readily dehydrofluorinated. The latter fluoroelastomers include, but are not limited to those which contain adjacent copolymerized units of vinylidene fluoride ($VF_2$) and hexafluoropropylene (HFP) as well as fluoroelastomers which contain adjacent copolymerized units of $VF_2$ (or tetrafluoroethylene) and a fluorinated comonomer having an acidic hydrogen atom such as 2-hydropentafluoropropylene; 1-hydropentafluoropropylene; trifluoroethylene; 2,3,3,3-tetrafluoropropene; or 3,3,3-trifluoropropene. Preferred fluoroelastomers include the copolymers of i) vinylidene fluoride with hexafluoropropylene and, optionally, tetrafluoroethylene (TFE); ii) vinylidene fluoride with a perfluoro(alkyl vinyl ether) such as perfluoro(methyl vinyl ether), 2-hydropentafluoroethylene and optionally, tetrafluoroethylene; iii) tetrafluoroethylene with propylene and 3,3, 3-trifluoropropene; and iv) ethylene with tetrafluoroethylene, perfluoro(methyl vinyl ether) and 3,3,3-trifluoropropylene.

Fluoroelastomers are generally prepared by free radical emulsion or suspension polymerization. The polymerizations may be carried out under steady-state conditions. Alternatively, batch, and semi-batch processes may be employed. Preferably, the polyhydroxy curable fluoroelastomers employed in this invention have an $M_w$ of at least 30,000, most preferably between 50,000 and 500,000.

In order to make a grafted fluoroelastomer in the dry, bulk state (i.e. containing less than 5 (preferably less than 1) weight percent water or solvent), wherein the grafted fluoroelastomer has a Mooney viscosity (large rotor, 135° C.) of less than 160 after a 1 minute preheat and 18 minutes of mixing, it is important that the polyhydroxy curable fluoroelastomer be substantially free of nucleophilic endgroups. Otherwise, it has been discovered that nucleophilic endgroups present on the fluoroelastomer chains react with some of the carbon-carbon double bonds on the fluoroelastomer during the grafting reaction or in subsequent processing (i.e. mixing, extruding, molding, etc.) to induce undesirable pre-vulcanization. The double bonds are present either initially on the ungrafted fluoroelastomer, or are generated during the grafting process.

By the term "nucleophilic endgroups" on the fluoroelastomer is meant p-fluoroalcohol endgroups, i.e. —$CF_2CH_2OH$. The amount of nucleophilic endgroups may be determined by NMR as described hereinafter in the Test Methods. By "substantially free of nucleophilic endgroups" is meant a fluoroelastomer having less than 10 mmoles of nucleophilic endgroups per kg of fluoroelastomer, preferably less than 2 mmoles per kg, most preferably less than 1 mmoles per kg fluoroelastomer. Direct determination of nucleophilic endgroup level can be difficult. An indirect measure is the rise in Mooney viscosity that takes place in a Mooney viscometer during mixing for 18 minutes at 135°

C. after a 1 minute preheat. Such a rise is due to reaction of nucleophilic endgroups with carbon-carbon double bonds on fluoroelastomer chains. The smaller the rise in Mooney viscosity that is observed during heating for 18 minutes at 135° C., the lower the level of β-fluoroalcohol groups on the fluoroelastomer. Preferably, no rise in Mooney viscosity occurs. A grafted fluoroelastomer or a graftable fluoroelastomer composition having a Mooney viscosity, ML(1+18) at 135° C., of less than 160, preferably less than 100, is defined as being substantially free of nucleophilic endgroups for purposes of this invention. The properties of viscosity broken grafted products (i.e. products that initially had an ML (1+18) @135° C.>160, but were exposed to high shear in order to reduce the viscosity) are undesirable.

Fluoroelastomers having low or no nucleophilic endgroups may be produced by a variety of means. For example, an organic peroxide, rather than an inorganic peroxide (e.g. ammonium persulfate) may be employed as the polymerization initiator. Examples of suitable organic peroxides include dialkylperoxydicarbonates such as diisopropylperoxydicarbonate (IPP), di-sec-butylperoxydicarbonate, di-sec-hexylperoxydicarbonate, di-n-propylperoxydicarbonate, and di-n-butyl peroxydicarbonate; peroxyesters, such as tert-butylperoxyisobutyrate and tert-butylperoxypivalate; diacylperoxides, such as dipropionyl peroxide; and di(perfluoroacyl)peroxides or di(chlorofluoroacyl)peroxides such as di(perfluoropropionyl)peroxide and di(trichloro-octafluorohexanoyl)peroxide. Alternatively, the polymerization reaction may take place in the presence of an organic or inorganic chloride salt (WO 2004/000896 A1) to yield $CF_2Cl$ endgroups, rather than nucleophilic endgroups. Similarly, the polymerization reaction may be run in the presence of a well known chain transfer agent such as an alkyl or perfluoroalkyl iodide or diiodide (U.S. Pat. No. 4,243,770), a hydrocarbon, ether, alcohol, ketone, etc. to control endgroups.

The resulting emulsions are usually coagulated by addition of electrolytes. The precipitated polymer is washed with water and then dried, for example in an air oven, to produce a substantially dry fluoroelastomer gum. By substantially dry is meant that the gum contains less than 5 weight percent (preferably less than 1 weight percent) water or solvent.

At least one accelerator is employed in the grafting process of this invention to facilitate the grafting. Accelerators include organo onium compounds (i.e. quaternary ammonium hydroxides or salts, quaternary phosphonium hydroxides or salts, and ternary sulfonium hydroxides or salts) and cyclic amines. Most preferred are quaternary ammonium salts such as $C_3$-$C_6$ symmetrical tetraalkylammonium salts, unsymmetrical tetraalkylammonium salts wherein the sum of alkyl carbons is between 8 and 24 and benzyltrialkylammonium salts wherein the sum of alkyl carbons is between 7 and 19. Specific examples include tetrabutylammonium bromide, tetrabutylammonium chloride, benzyltributylammonium chloride, benzyltriethylammonium chloride, tetrabutylammonium hydrogen sulfate and tetrabutylammonium hydroxide. Also preferred are quaternary phosphonium salts, such as tetrabutylphosphonium salts, benzyltriphenylphosphonium chloride, tributylallylphosphonium chloride, tributyl-2-methoxypropylphosphonium chloride, and benzyldiphenyl(dimethylamino) phosphonium chloride. Phenolate is a preferred anion for the quaternary ammonium and phosphonium salts. Other suitable accelerators include 1,8-diazabicyclo[5.4.0]undec-7-ene and 1,5-diazabicyclo[4.3.0]non-5-ene. Quaternary ammonium salts are preferred because they exhibit enhanced activity in this system. The amount of accelerator used is between 0.1 and 10 parts by weight per hundred parts fluoroelastomer. Preferably, 0.5-3.0 parts accelerator per hundred parts fluoroelastomer is used.

The grafting reaction is also carried out in the presence of at least one acid acceptor such as a metal oxide or metal hydroxide. Metal oxides or hydroxides which are useful acid acceptors include calcium hydroxide, magnesium oxide, lead oxide, and calcium oxide. Calcium hydroxide and magnesium oxide are preferred. The amount of acid acceptor is typically between 1 and 20 phr, preferably 3 to 12 phr.

In a grafting process of this invention, a substantially dry polyhydroxy curable fluoroelastomer that is substantially free of nucleophilic endgroups is mixed in the bulk with i) a monophenol having a pendant group, ii) an accelerator and iii) an acid acceptor to form a graftable fluoroelastomer composition having a Mooney viscosity (large rotor, 135° C.) of less than 160 after a 1 minute preheat and 18 minutes of mixing. The latter graftable composition is an embodiment of this invention. The graftable composition is preferably made at a temperature below which grafting may occur, i.e. below 80° C. so that the accelerator and acid acceptor are well dispersed in the composition prior to grafting. In the grafting process, the graftable composition is then heated to a temperature between 80° C. and 250° C. (preferably 130° C.-200° C.), thereby producing a grafted fluoroelastomer having a plurality of pendant groups bonded to carbon atoms on said grafted fluoroelastomer through monophenols. The grafted fluoroelastomer is substantially free of nucleophilic endgroups and has a ML(1+18) at 135° C.<160. It is important that the grafted fluoroelastomer be substantially free of nucleophilic endgroups so that, during further processing, the endgroups do not react with residual carbon-carbon double bonds to induce pre-vulcanization at elevated temperatures.

As an alternative to the above process of the invention, the mixing and heating steps may be combined into a single step wherein mixing of the ingredients takes place at a temperature between 80° C. and 250° C., preferably 130° C.-200° C., so that grafting occurs during mixing.

In another embodiment of the grafting process of the invention, dehydrofluorination of the fluoroelastomer may take place first, in the absence of grafting agent. The unsaturated fluoroelastomer may then be readily grafted. Such a process comprises a) mixing in the bulk, at a temperature between 80° and 250° C., i) a polyhydroxy curable fluoroelastomer gum, said fluoroelastomer being substantially free of nucleophilic endgroups, with ii) an accelerator and iii) an acid acceptor, in the absence of a grafting agent, to form an unsaturated fluoroelastomer composition; b) mixing, preferably at a temperature below 80° C., i) said unsaturated fluoroelastomer composition with ii) a monophenol having a pendant group, iii) an accelerator and iv) an acid acceptor to form a graftable composition; and c) heating said graftable composition at a temperature between 80° C.-250° C., thereby producing a grafted fluoroelastomer having a plurality of pendant groups bonded to carbon atoms through monophenols, said grafted fluoroelastomer being substantially free of nucleophilic endgroups and having a Mooney viscosity, ML(1+18) at 135° C., of less than 160.

In all of the processes of the invention, preferably the grafting reaction takes place while the graftable composition is being gently mixed, such as in a twin screw extruder at 150 rpm. This yields a more uniform grafted product.

Grafted fluoroelastomer compositions prepared by any of the above grafting processes are also embodiments of the invention.

Optionally, additives generally used in rubber processing may be present during the grafting reaction or incorporated afterwards. Such additives include curatives, process aids, and fillers such as carbon black, fluoropolymer micropowders and mineral powders. However, curative may only be present during the grafting reaction if the curative is stable to the grafting conditions, i.e. does not initiate crosslinks during grafting.

The grafted fluoroelastomers of this invention have utility in end uses such as injection, compression, or transfer molded seals, o-rings, and gaskets, extruded tubing and hoses, extruded wire coatings, coatings applied by solvent or flame spray processes, process aids for polyolefin extrusion, and others. Grafted fluoroelastomers having unsaturated pendant groups may be crosslinked via a free radical reaction (radiation or peroxide induced), without the need for a multifunctional coagent such as triallyl isocyanurate, and may require less post cure than similar, non-grafted fluoroelastomers.

The invention is now illustrated by the following embodiments in which all parts are by weight unless otherwise indicated.

EXAMPLES

Test Methods

Physical properties of the compositions described in the examples were measured according to the following test procedures.

| | |
|---|---|
| Moving Disc Rheometer (MDR) | ASTM D5289 |
| Tensile Strength, Tb | ASTM 1708 |
| Modulus, $M_{100}$ | ASTM 1708 |
| Elongation at Break, Eb | ASTM 1708 |
| Hardness | ASTM D2240 |
| Compression Set-B | ASTM D395 |
| Mooney Scorch | ASTM D1646 |

The level of β-fluoroalcohol (—$CF_2CH_2OH$) endgroups in fluoroelastomers was determined by proton NMR and expressed as mmoles of β-fluoroalcohol per kg of fluoroelastomer. 20.0 mg of fluoroelastomer polymer was dissolved in 1.00 ml $d^6$-acetone and 256 scans were run on a Bruker 500 MHz DRX spectrometer using a 30 sec pulse delay time to allow complete relaxation before applying the next 2.55 sec, 90 degree pulse. An internal standard, 3-trifluoromethyl anisole, was used when needed and chemical shifts were expressed in ppm relative to TMS=0.000. The actual calculation involved determining the ratio of the integral of the two protons on the β-fluoroalcohol $CH_2$ group (3.75 ppm) to the sum of the integrals of the two protons on the $CH_2$ group of copolymerized $VF_2$ units (2.50 and 3.25 ppm). This ratio was then multiplied by the number of millimoles of copolymerized $VF_2$ units per kg of fluoroelastomer (known from the level of copolymerized monomers in the fluoroelastomer being tested) to yield the level of β-fluoroalcohol (—$CF_2CH_2OH$) endgroups.

Example 1

Four graftable compositions of the invention (Samples 1-4) and a control (Control A) were prepared on a 2-roll rubber mill. The formulations are shown in Table I. Viton® A is an emulsion polymerized (initiated by ammonium persulfate and sodium sulfite) copolymer of about 60 weight percent vinylidene fluoride ($VF_2$) units and 40 weight percent hexafluoropropylene (HFP) units, commercially available from DuPont Dow Elastomers L.L.C.). The level of β-fluoroalcohol endgroups was determined to be about 30 mmoles per kg fluoroelastomer. Miraflon® FR-5520 (formerly available from Asahi Chem) is a suspension polymerized (initiated by diisopropyl peroxydicarbonate) fluoroelastomer (made according to U.S. Pat. No. 4,985,520) having a copolymerized monomer composition similar to that of Viton® A, but having less than 1 mmole β-fluoroalcohol endgroups per kg fluoroelastomer.

The Mooney viscosity of these compounds was measured with a large rotor at 135° C. over an 18 minute period after an initial 1 minute preheat, i.e. ML(1+18), at 135° C. The magnitude of the step increase in Mooney viscosity between 2 and 12 minutes was a monotonically increasing function of the fraction of Viton® A in these compounds and represents the increase in scorch. The increase in Mooney viscosity of Control A was beyond the measurement capability of the instrument.

TABLE I

| Formulation, phr[1] | Sample 1 | Sample 2 | Sample 3 | Sample 4 | Control A |
|---|---|---|---|---|---|
| Miraflon FR-5520 | 100 | 90 | 80 | 70 | 0 |
| Viton ® A | 0 | 10 | 20 | 30 | 100 |
| BTPPC[2] | 0.80 | 0.80 | 0.80 | 0.80 | 0.80 |
| 4-t-butyl phenol | 1.82 | 1.82 | 1.82 | 1.82 | 1.82 |
| $Ca(OH)_2$ | 6.0 | 6.0 | 6.0 | 6.0 | 6.0 |
| Elastomag 170[3] | 3.0 | 3.0 | 3.0 | 3.0 | 3.0 |
| Net β-fluoroalcohol level on fluoroelastomer blend, mmoles/kg fluoroelastomer | <1 | 3 | 6 | 9 | 30 |
| Rise in Mooney viscosity between 2 and 12 minutes | 2.0 | 13.1 | 44.7 | 70.7 | >215 |
| ML (1 + 18) | 56 | 71 | 100 | 128 | >160 |

[1]phr is parts weight per hundred parts rubber (i.e. fluoroelastomer)
[2]benzyltriphenylphosphonium chloride
[3]MgO available from Akrochem Corp.

Example 2

Graftable compositions of Viton® B (an emulsion polymerized fluoroelastomer copolymer of vinylidene fluoride, hexafluoropropylene and tetrafluoroethylene initiated with ammonium persulfate), Viton® B-600 (having isopropyl alcohol endgroups due to polymerization in the presence of isopropyl alcohol chain transfer agent), both fluoroelastomers available from DuPont Dow Elastomers, and a Viton® B-600 analog modified with methylethyl ketone (MEK), rather with than isopropyl alcohol, were compared to determine the relative scorch tendencies of a series of polymers that have decreasing levels of —$CF_2CH_2OH$ endgroups, but the same overall composition and similar molecular weight and molecular weight distribution. ML(1+18)@135° C. was measured. Also, the scorch tendencies were assessed by measuring the Mooney viscosity at 135° C. for 60 minutes using the small rotor that is usually employed for a Mooney scorch measurement. The standard Mooney scorch test employing the small rotor was not used because the method automatically stops the test after only a 15

Mooney unit rise and larger increases were encountered. The following formulations were mill mixed and subjected to the modified Mooney viscosity test, recording the step change in viscosity that occurred between 6 and 18 minutes. Formulations and scorch results are shown in Table II. Samples 5-6 are graftable compositions of the invention while Control B had too high a level of nucleophilic endgroups. As measured by the NMR test method, the β-fluoroalcohol level of the fluoroelastomers was: Viton® B 14 mmoles per kg fluoroelastomer, Viton® B-600 1.4 mmoles per kg fluoroelastomer and the MEK analog not measured, but less than 1.4 mmoles/kg.

TABLE II

| Formulation, phr | Control B | Sample 5 | Sample 6 |
|---|---|---|---|
| Viton ® B | 100 | 0 | 0 |
| Viton ® B-600 | 0 | 100 | 0 |
| MEK modified fluoroelastomer | 0 | 0 | 100 |
| Tetrabutylammonium hydrogen sulfate | 0.70 | 0.70 | 0.70 |
| Elastomag 170 | 3.0 | 3.0 | 3.0 |
| Eugenol[1] | 4.0 | 4.0 | 4.0 |
| Rise in Mooney viscosity between 6 and 18 minutes | 85 | 57 | 39 |
| ML (1 + 18) at 135° C. | >160[2] | 82 | 59 |

[1]For ease of mixing, eugenol was not added neat, but as 2.0 g eugenol adsorbed onto 2.0 g of an inert substrate (Microcel E)
[2]Broke loose from rotor, so could not be accurately measured

Example 3

This example demonstrates the attachment of a monophenol to the polymer and establishes the existence of a soluble, grafted composition based on a fluoroelastomer with very few β-fluoroalcohol endgroups. Using a 2-roll rubber mill, 100 g Dai-el G-902 (a fluoroelastomer commercially available Daikin having the approximate composition 33 wt. % vinylidene fluoride, 43 wt. % hexafluoropropylene and 24 wt. % 15 tetrafluoroethylene), 2.07 mmoles of a tetrabutylammonium salt accelerator, 18.3 mmoles of 4-t-butyl phenol, 3.0 g Ca(OH)$_2$ and 3.0 g Elastomag 171 (MgO) were intimately mixed. The resulting compound was then treated in a Haake internal mixer for 10 minutes at 170° C. The resulting composition remained free of gelation and was soluble in acetone, except for the inorganic bases. A 7% (weight per volume) solution of this composition was prepared in acetone and then gradually precipitated with excess isopropanol, which is a solvent for 4-t-butyl phenol, but a non-solvent for the fluoroelastomer. The precipitated polymer was thoroughly dried and a small portion of it was dissolved in d$^6$-acetone to prepare a sample for H-NMR analysis. The NMR spectrum clearly showed a strong absorption at 1.30 ppm relative to tetramethyl silane, clearly indicating the presence of nine equivalent methyl protons of the t-butyl group of the phenol and their attachment to the polymer because of their partitioning with the polymer in the precipitation process which would have separated any non-grafted 4-t-butyl phenol. The efficiency of the grafting process was high. Over 79% of the 4-t-butyl phenol that was present in the composition after the Haake treatment was present in the precipitated polymer. This was determined by comparing the NMR spectra of the Haake product with that of the product subsequently purified by precipitation from acetone with excess isopropanol.

Example 4

This example shows the utility of a eugenol-grafted fluoroelastomer that can be rendered peroxide curable without the use of a traditional radical trap or so-called coagent, such as triallylisocyanurate.

A fluoroelastomer containing copolymerized units of tetrafluoroethylene (TFE), propylene (P) and vinylidene fluoride (VF$_2$) was prepared by semi-batch emulsion polymerization, carried out at 60° C. in a well-stirred reaction vessel. A 33-liter, horizontally agitated reactor was charged with 23 liters of deionized, deoxygenated water, 115 g of Forafac 1033D surfactant and 10.4 g of sodium hydroxide. The reactor was heated to 60° C. and then pressurized to 2.07 MPa with a mixture of 40.0 wt. % TFE, 58.0 wt. % VF$_2$, and 2.0 wt. % propylene. A 274 ml sample of a 10% ammonium persulfate/1.75% sodium hydroxide initiator solution was then added. A mixture of 56.7% wt. % TFE, 32.2 wt. % VF$_2$, and 11.1 wt. % propylene was applied to the reactor to maintain a pressure of 2.07 MPa throughout the polymerization. The initiator solution was fed continuously at 5 ml/hour until monomer feed was discontinued. After 80 g of monomer mixture had been consumed, 28 g of mixed diiodides (I—(CF$_2$)$_n$—I, where n is 4, 6, and 8) was fed to the reactor. After 3500 g of monomer mixture had been consumed, 4-iodo-3,3,4,4-tetrafluorobutene (ITFB) was continuously fed at a ratio of 7.5 ml per 3000 g of monomer mixture until a total of 10 ml had been fed. After a total of 8000 g monomer mixture was supplied to the reactor, monomer addition was discontinued and the reactor was purged of residual monomer. The total reaction time was 23 hours. The resulting emulsion was coagulated by addition of aluminum sulfate solution and washed with deionized water. The polymer crumb was dried for two days at 60° C. Mooney viscosity, ML-10 (121° C.), was 34. Total iodides in the fluoroelastomer was 0.247 wt. % and the levels of TFE, P and VF$_2$ were 56.6 wt. %, 11 wt. % and 32 wt. %, respectively. This fluoroelastomer is not directly peroxide curable in the absence of a radical trap such as triallylisocyanurate.

The fluoroelastomer was grafted with eugenol (a monophenol having an allyl pendant group) and then cured with an organic peroxide, in the absence of a coagent. Grafting was performed by compounding on a rubber mill 100 g of fluoroelastomer with 0.75 g tetrabutylammonium hydrogen sulfate (TBAHS), 2.0 g eugenol on 1.0 g Microcel E carrier, 6.0 g Ca(OH)$_2$ and 6.0 g Elastomag 170 (MgO). The resulting composition was then treated in a Haake internal mixer for 4 minutes at 177° C. during which time the grafting reaction occurred. 95 g of the grafted product was then mill mixed with 2.46 g Luperco 101-XL peroxide (available from Pennwalt Corporation) and 24.6 g MT carbon black. Curing characteristics of the resulting composition were then measured in 24 minute MDR tests at 177°, 190° and 200° C. (Table III). There was no cure response (i.e. no rise in torque (S)) in a similar composition that omitted eugenol, i.e. a composition that had not been grafted with a monophenol having an allyl pendant group.

TABLE III

| MDR Temperature | $S_{min}$, dN·m | $S_{max}$, dN·m | ts2, minutes | tc50, minutes | tc90, minutes | Peak Rate, dN·m/minute |
|---|---|---|---|---|---|---|
| 177° C. | 2.58 | 28.68 | 0.67 | 2.18 | 7.87 | 9.72 |
| 190° C. | 2.80 | 27.57 | 0.52 | 1.03 | 3.13 | 22.73 |
| 200° C. | 2.68 | 24.90 | 0.40 | 0.65 | 1.36 | 38.67 |

Tensile properties were measured on slabs that had been press cured at 190° C. for 15 minutes and then post cured in an air oven at 200° C. for 70 hours. Compression set was measured on pellets that had been cured under the same conditions as the slabs. Results are shown in Table IV.

TABLE IV

| | |
|---|---|
| $M_{100}$ | 9.86 MPa |
| Tb | 17.2 MPa |
| Eb | 152% |
| Compression Set, 70 hours at 200° C. | 17% |

Example 5

This example demonstrates that a bisphenol curable fluoroelastomer that is not curable by organic peroxide prior to grafting, can be grafted with eugenol and then be peroxide cured in the absence of a co-agent. The fluoroelastomer was a copolymer of ethylene, tetrafluoroethylene, perfluoro(methyl vinyl ether) and 3,3,3-trifluoropropene that was prepared substantially according to Example 2 of U.S. Pat. No. 6,664,339 B2.

100 g of the fluoroelastomer was mill compounded with 1.3 g tetrabutylammonium hydrogen sulfate (TBAHS), 9.0 g Ca(OH)$_2$ and 2.65 g eugenol on 1.32 g Microcel E support. This compound was statically heat treated in a 121° C. press for 15 minutes as a 0.25 inch thick slab. 62.1 g of the heat treated composition was them mill mixed with 1.55 g Luperco 101-XL peroxide and subjected to MDR (24 minutes at 177° C.) and Mooney scorch (30 minutes at 121° C.) tests. Results are shown in Table V. A similar composition wherein the fluoroelastomer was not grafted with eugenol showed no cure response.

TABLE V

| | |
|---|---|
| Mooney Scorch | |
| Minimum viscosity | 48.3 MU[1] |
| Ts3 | 9.1 minutes |
| Viscosity at 30 minutes | 57 MU |
| Curing Characteristics | |
| $S_{min}$ | 1.45 dN·m |
| $S_{max}$ | 22.1 dN·m |
| ts2 | 0.55 minutes |
| tc50 | 2.54 minutes |
| tc90 | 10.55 minutes |
| Peak rate | 6.09 |

[1]MU is Mooney units

Example 6

This example shows the difference in processability and cure response between two dipolymers that differ grossly in their β-fluoroalcohol endgroup content. As reported in Example 1, Viton® A has 30 mmoles of —CF$_2$CH$_2$OH ends per kg of fluoroelastomer and Miraflon FR-5520 has an undetectable level (<1 mmoles/kg fluoroelastomer) as measured by proton NMR. Graftable compositions containing each fluoroelastomer were made by mill compounding 200 g of fluoroelastomer with 1.00 g TBAHS, 6.0 g Ca(OH)$_2$, 6.0 g Elastomag 170 (MgO) and 6.00 g eugenol on 3.0 g Microcel E support. These compositions were then heat treated in a Haake internal mixer for 10 minutes at 150 C. The resulting grafted compositions, after addition of 3.0 phr Luperco 101-XL peroxide on a rubber mill, were then tested for processability by subjecting them to a Mooney scorch test for 30 minutes at 121° C. and by an MDR measurement at 177° C. for 24 minutes. Results are shown in Table VI. Control C was the grafted Viton® A composition. Sample 7 of the invention was the grafted Miraflon FR-5520 composition.

TABLE VI

| | Control C | Sample 7 |
|---|---|---|
| Mooney Scorch | | |
| Minimum viscosity, MU | 65 | 43 |
| Ts3, minutes | 6.5 | 14 |
| Ts18, minutes | 16 | >30 |
| Viscosity at 30 minutes, MU | >83 | 47 |
| MDR | | |
| $S_{min}$, dN·m | 1.6 | 1.1 |
| $S_{max}$, dN·m | 4.9 | 13.3 |
| ts2, minutes | 14.4 | 1.2 |
| tc50, minutes | 9.13 | 2.57 |
| tc90, minutes | 20.87 | 8.65 |
| Peak rate, dN·m/minute | 0.41 | 4.04 |

Example 7

The fluoroelastomer employed in this example was Viton® GF-300S, containing copolymerized units of vinylidene fluoride, hexafluoropropylene and tetrafluoroethylene and having iodide endgroups. The level of β-fluoroalcohol groups was determined by proton NMR to be less than 0.6 mmoles per kg of fluoroelastomer.

On a two roll rubber mill, 100 g Viton® GF-300S was mixed with 0.60 g TBAHS, 3.0 g Ca(OH)$_2$, 3.0 g Elastomag 170 (MgO) and 1.59 g 2-allyl phenol on 1.0 g Microcel-E support. This graftable composition was then heated 10 minutes at 135° C. as a 0.25 inch (0.64 cm) thick slab in a press to produce the fluoroelastomer grafted with allyl phenol. The entire heat treated composition was then mill compounded at ambient temperature with 3.0 g Luperco 101-XL peroxide and subjected to a 24 minute MDR test at 177° C. The MDR response was rapid and substantial, giving an $S_{min}$ of 0.20 dN·m, $S_{max}$ of 8.24 dN·m, ts2 of 1.01 minutes, tc50 of 1.30 minutes, tc90 of 3.19 minutes, and a peak rate of 7.10 dN·m/minute.

Example 8

In this example, a graftable composition of the invention (Sample 8) and a control composition absent grafting agent (Control D) were prepared. The fluoroelastomer employed was Viton® B-600. First, fluoroelastomer, Elastomag 170 (MgO), Ca(OH)$_2$, and tetrabutylammonium hydrogen sulfate (TBAHS) were intimately mixed on a room temperature mill. After removal from the mill in sheet form, the compounds were granulated and blended with the appropriate amount of eugenol. Formulations are shown in Table VII.

TABLE VII

| Formulation, phr | Control D | Sample 8 |
|---|---|---|
| Viton ® B-600 | 100 | 100 |
| Elastomag 170 | 3 | 3 |
| Ca(OH)$_2$ | 3 | 3 |
| TBAHS | 0.7 | 0.7 |
| Eugenol[1] | 0 | 4 |
| ML (1 + 18) @ 135° C. | 59.1 | 130.9 |

[1] 2 g eugenol on 2 g Microcel E silica support

The grafting reaction was run on a twin screw extruder. The twin screw extruder was a 28 mm, co-rotating, fully intermeshing design with four temperature control zones. Compound may be fed to the extruder using a weight loss feeder, or by using a "flood feeding" technique in which the material entry point to the screws is continuously covered with feed material. Compound exits the extruder through a 2-hole strand die onto a cooled belt. Volatiles are removed from the compound through a vacuum port approximately six screw diameters upstream from the die.

The compositions in Table VII were processed through the twin screw extruder under the following conditions:

temperature profile, from feed to exit (° C.) 160, 160, 200, 200 150 rpm screw speed Feeding technique: flood feeding After extrusion, Control D and grafted Sample 8 were mill mixed with 2 phr of 2,5-dimethyl-2,5-di(t-butylperoxy) hexane (DBPH, Aldrich). Curing characteristics, measured by MDR at 177° C., 0.5° arc for 24 minutes, are in Table VIII. Only the grafted composition of the invention (Sample 8') showed curing with the peroxide as evidenced by the rise in torque ($S_{max}-S_{min}$).

TABLE VIII

| | Control D' | Sample 8' |
|---|---|---|
| $S_{min}$, dN · m | 0.5 | 1.81 |
| $S_{max}$, dN · m | 0.51 | 8.02 |

Example 9

Fluoroelastomers employed in this example were a) Viton® A-500 (a copolymer of vinylidene fluoride and hexafluoropropylene having a β-fluoroalcohol level of 21 mmoles/kg fluoroelastomer), b) Viton® B-600 as described above, c) Viton® GF-300S as described above and d) FKM-1, a copolymer of tetrafluoroethylene, propylene and 3,3,3-trifluoropropene that was prepared substantially according to Example 2 of U.S. Pat. No. 6,703,450 B2. The level of β-fluoroalcohol groups on FKM-1 was not measured, but should be <0.6 mmoles/kg fluoroelastomer since the elastomer does not contain VF$_2$ units.

Graftable compositions were made by the same method as in Example 8. Formulations and ML(1+18) at 135° C. of the graftable compositions are shown in Table IX. These formulations were grafted on a twin screw extruder as described in Example 8. Twin screw extrusion conditions were as follows:

For Control E, Samples 9 and 10:
temperature profile, from feed to exit (° C.) 160, 170, 170, 170 150 rpm screw speed
Feeding technique: flood feeding For Sample 11:
temperature profile, from feed to exit (° C.) 140, 140, 140, 140 100 rpm screw speed
Feed rate: 30 g/min The results in Table IX show that the non-inventive graftable composition Control E results in an intractably high viscosity after grafting. Its viscosity was more than four times the viscosity of pure, ungrafted Viton® A-500 gum (ML(1+10)@121° C. is 51.8). By contrast, the viscosity of grafted Sample 9 was only about 35% higher than the viscosity of ungrafted Viton® B-600 (ML (1+10)@121° C. of 67.3) due to the much lower β-fluoroalcohol content of B-600 as compared to A-500. The viscosity increases upon grafting of Viton® GF-300S (ungrafted ML(1+10)@121° C. of 25.8) and FKM-1 (ungrafted ML(1+10)@121° C. of 55.0) in Samples 10 and 11, respectively, was even smaller, about 15% and 13% respectively, corresponding with the very low β-fluoroalcohol content of these polymers.

TABLE IX

| Formulation, phr | Control E | Sample 9 | Sample 10 | Sample 11 |
|---|---|---|---|---|
| Viton ® A-500 | 100 | 0 | 0 | 0 |
| Viton ® B-600 | 0 | 100 | 0 | 0 |
| Viton ® GF-300S | 0 | 0 | 100 | 0 |
| FKM-1 | 0 | 0 | 0 | 100 |
| Elastomag 170 | 9 | 9 | 9 | 3 |
| Ca(OH)$_2$ | 0 | 0 | 0 | 6 |
| TBAHS | 0.4 | 0.4 | 0.4 | 1.0 |
| Eugenol[1] | 4 | 4 | 4 | 4 |
| ML (1 + 18) @135° C. | 163.5 | 76.4 | 19.8 | 48.5 |
| ML (1 + 10) @121° C. after grafting on the twin screw | >222[2] | 91.4 | 29.7 | 62 |

[1] 2 g eugenol on 2 g Microcel-E support
[2] exceeded torque limit of the instrument The cure response of twin screw grafted Samples 9-11 after mill mixing with 2 phr DBPH are shown in Table X. To show the improvement in cure response that is due to performing the grafting process while mixing (e.g. in an extruder) vs. cure response of similar compositions that were grafted under a lower shear environment, the granulated versions of graftable compositions Samples 9 and 10 (i.e. not extruded) were mill mixed with 2 phr DBPH and tested for cure response. These latter compositions are labeled Samples 9M and 10M, respectively in Table X.

TABLE X

| | Sample 9 | Sample 10 | Sample 9 M | Sample 10 M | Sample 11 |
|---|---|---|---|---|---|
| $S_{min}$, dN · m | 1.74 | 0.33 | 0.97 | 0.25 | 1.39 |
| $S_{max}$, dN · m | 8.41 | 5.11 | 6.22 | 1.99 | 13.39 |

TABLE X-continued

| | Sample 9 | Sample 10 | Sample 9 M | Sample 10 M | Sample 11 |
|---|---|---|---|---|---|
| Tc50, minutes | 2.1 | 1.47 | 8.49 | 2.1 | 2.03 |

The results in Table X indicate that inventive compositions Samples 9, 9M, 10, 10M and 11 all show useful levels of peroxide cure response. Mill grafted Samples 9M and 10M cured more slowly and to lower levels of torque than the corresponding twin screw grafted compositions. Sample 11 shows that $VF_2$ need not be present in the polymer backbone, as long as a phenol reactive moiety is present such as 3,3,3-trifluoropropene.

What is claimed is:

1. A process for making a grafted fluoroelastomer, said process comprising:
    a) mixing in the bulk i) a polyhydroxy curable fluoroelastomer gum, said fluoroelastomer being substantially free of nucleophilic endgroups with ii) a monophenol having a pendant group, iii) an accelerator and iv) an acid acceptor to form a graftable fluoroelastomer composition; and
    b) heating said graftable composition at a temperature between 80° C. and 250° C., thereby producing a grafted fluoroelastomer having a plurality of pendant groups bonded to carbon atoms on said grafted fluoroelastomer through monophenols, said grafted fluoroelastomer being substantially free of nucleophilic endgroups and having a Mooney viscosity, ML(1+18) at 135° C., of less than 160.

2. A process of claim 1 wherein said mixing step A) is at a temperature less than 80° C.

3. A process of claim 1 wherein said heating step B) is performed with gentle mixing.

4. A process of claim 1 wherein said heating step B) is to a temperature between 130° C. and 200° C.

5. A process of claim 1 wherein said fluoroelastomer gum is selected from the group consisting of copolymers of i) vinylidene fluoride with hexafluoropropylene; ii) vinylidene fluoride with hexafluoropropylene and tetrafluoroethylene; iii) vinylidene fluoride with a perfluoro(alkyl vinyl ether), 2-hydropentafluoroethylene and tetrafluoroethylene; iv) tetrafluoroethylene with propylene and 3,3,3-trifluoropropene; and v) ethylene with tetrafluoroethylene, perfluoro(methyl vinyl ether) and 3,3,3-trifluoropropylene.

6. A process of claim 1 wherein said monophenol is selected from the group consisting of 2-methoxy-4-allyl phenol; 2-allylphenol; 2,5-diallylphenol; p-acetamidophenol; m-hydroxy-N-methylacetanilide; p-hydroxymethylbenzoic acid phenyl ester; hydroxybenzoic acid phenylesters; 3-hydroxy-2-naphthoic acid phenyl ester; a monoacrylate ester of a bisphenol; a monoacrylate ester of a dihydroxybenzene; a monoacrylate ester of a dihydroxynaphthalene; 4-hydroxystyrene; a monoallyl ether of bisphenol AF; and a monovinyl ether of bisphenol AF.

7. A process for making a grafted fluoroelastomer, said process comprising:
    mixing in the bulk, at a temperature between 80° C. and 250° C., i) a polyhydroxy curable fluoroelastomer gum, said fluoroelastomer being substantially free of nucleophilic endgroups with ii) a monophenol having a pendant group, iii) an accelerator and iv) an acid acceptor to form a grafted fluoroelastomer having a plurality of pendant groups bonded to carbon atoms on said grafted fluoroelastomer through monophenols, said grafted fluoroelastomer being substantially free of nucleophilic endgroups and having a Mooney viscosity, ML(1+18) at 135° C., of less than 160.

8. A process of claim 7 wherein said fluoroelastomer gum is selected from the group consisting of copolymers of i) vinylidene fluoride with hexafluoropropylene; ii) vinylidene fluoride with hexafluoropropylene and tetrafluoroethylene; iii) vinylidene fluoride with a perfluoro(alkyl vinyl ether), 2-hydropentafluoroethylene and tetrafluoroethylene; iv) tetrafluoroethylene with propylene and 3,3,3-trifluoropropene; and v) ethylene with tetrafluoroethylene, perfluoro(methyl vinyl ether) and 3,3,3-trifluoropropylene.

9. A process of claim 7 wherein said monophenol is selected from the group consisting of 2-methoxy4-allyl phenol; 2-allylphenol; 2,5-diallylphenol; p-acetamidophenol; m-hydroxy-N-methylacetanilide; p-hydroxymethylbenzoic acid phenyl ester; hydroxybenzoic acid phenylesters; 3-hydroxy-2-naphthoic acid phenyl ester; a monoacrylate ester of a bisphenol; a monoacrylate ester of a dihydroxybenzene; a monoacrylate ester of a dihydroxynaphthalene; 4-hydroxystyrene; a monoallyl ether of bisphenol AF; and a monovinyl ether of bisphenol AF.

10. A process for making a grafted fluoroelastomer from a polyhydroxy curable fluoroelastomer gum, said process comprising:
    a) mixing in the bulk, at a temperature between 80° and 250° C., i) a polyhydroxy curable fluoroelastomer gum, said fluoroelastomer being substantially free of nucleophilic endgroups, with ii) an accelerator and iii) an acid acceptor, in the absence of a grafting agent, to form an unsaturated fluoroelastomer;
    b) mixing i) said unsaturated fluoroelastomer composition with ii) a monophenol having a pendant group, iii) an accelerator and iv) an acid acceptor to form a graftable composition; and
    c) heating said graftable composition at a temperature between 80° C.-250° C., thereby producing a grafted fluoroelastomer having a plurality of pendant groups bonded to carbon atoms through monophenols, said grafted fluoroelastomer being substantially free of nucleophilic endgroups and having a Mooney viscosity, ML(1+18) at 135° C., of less than 160.

11. A process of claim 10 wherein said fluoroelastomer gum is selected from the group consisting of copolymers of i) vinylidene fluoride with hexafluoropropylene; ii) vinylidene fluoride with hexafluoropropylene and tetrafluoroethylene; iii) vinylidene fluoride with a perfluoro(alkyl vinyl ether), 2-hydropentafluoroethylene and tetrafluoroethylene; iv) tetrafluoroethylene with propylene and 3,3,3-trifluoropropene; and v) ethylene with tetrafluoroethylene, perfluoro(methyl vinyl ether) and 3,3,3-trifluoropropylene.

12. A process of claim 10 wherein said monophenol is selected from the group consisting of 2-methoxy-4-allyl phenol; 2-allylphenol; 2,5-diallylphenol; p-acetamidophenol; m-hydroxy-N-methylacetanilide; p-hydroxymethylbenzoic acid phenyl ester; hydroxybenzoic acid phenylesters; 3-hydroxy-2-naphthoic acid phenyl ester; a monoacrylate ester of a bisphenol; a monoacrylate ester of a dihydroxybenzene; a monoacrylate ester of a dihydroxynaphthalene; 4-hydroxystyrene; a monoallyl ether of bisphenol AF; and a monovinyl ether of bisphenol AF.

* * * * *